United States Patent
Sugita

(10) Patent No.: US 6,674,792 B1
(45) Date of Patent: Jan. 6, 2004

(54) DEMODULATION OF RECEIVER WITH SIMPLE STRUCTURE

(75) Inventor: Naohiko Sugita, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 09/664,743

(22) Filed: Sep. 19, 2000

(30) Foreign Application Priority Data

Sep. 21, 1999 (JP) .......................................... 11-267290

(51) Int. Cl.$^7$ ................................................. H04B 1/67
(52) U.S. Cl. ....................................................... 375/148
(58) Field of Search ............................... 375/130, 147, 375/148; 370/335, 342, 441

(56) References Cited

U.S. PATENT DOCUMENTS

| 5,659,573 A | * | 8/1997 | Bruckert et al. | ............ | 375/142 |
| 5,809,020 A | | 9/1998 | Bruckert et al. | | |
| 6,118,806 A | * | 9/2000 | Niida et al. | .............. | 375/148 |
| 6,434,366 B1 | * | 8/2002 | Harrison et al. | .............. | 455/69 |
| 6,563,858 B1 | * | 5/2003 | Fakatselis et al. | .......... | 375/148 |

FOREIGN PATENT DOCUMENTS

| EP | 0 749 215 A2 | 12/1996 |
| EP | 0 893 888 A2 | 1/1999 |
| JP | 8-237171 | 9/1996 |
| JP | 8-335899 | 12/1996 |
| JP | 10-173629 | 6/1998 |

OTHER PUBLICATIONS

Daniel L. Noneaker, "Optimal Combining for Rake Reception in Mobile Cellular CDMA Forward Links," Military Communications Conference, 1998, MILCOM 98, Proceedings, IEEE, 1998, pp. 842–846.

Heinrich Meyr, Marc Moeneclaey and Stefan Fechtel, "Digital Communication Receivers", John Wiley & Sons, pp. 690–697.

* cited by examiner

Primary Examiner—Tesfaldet Bocure
(74) Attorney, Agent, or Firm—Young & Thompson

(57) ABSTRACT

A receiver includes inversely spreading circuit, a RAKE synthesizing circuit, a noise measuring circuit, a weighting circuit and a decoder. The inversely spreading circuit inversely spreads a reception signal for every path using a spreading code to produce path data signals for paths. The RAKE synthesizing circuit synthesizes the path data signals to output a RAKE synthesis signal while carrying out a weighting operation for every path such that the RAKE synthesis signal has a maximum S/N ratio. The noise measuring circuit measures a noise level of each of the path data signals, and calculates a total noise amount for the paths from the measured noise levels. The weighting circuit carries out a weighting operation of the RAKE synthesis signal based on the total noise amount to produce a weighted signal such that a time change of distortion in the RAKE synthesis signal is cancelled. The decoder decodes the weighted signal to produce an information sequence.

18 Claims, 9 Drawing Sheets

DEMODULATION OF RECEIVER WITH SIMPLE STRUCTURE

BACKGROUND OF THE INVENTION

1. Field of the Invention

The present invention relates to a demodulating method and a demodulating circuit in a radio receiver. More particularly, the present invention relates to a method and a circuit for demodulating a reception signal in which selective fading occurs on a transmission path.

2. Description of the Related Art

In the code division multiple access (CDMA) system, information bit sequences are subjected to primary modulation on a transmitting side and then are multiplied by different spreading codes for respective channels to be modulated and transmitted using an identical frequency band. In a demodulating circuit on a receiving side, a reception signal is multiplied by a spreading code identical with the spreading code used for a desired one of the plurality of channels on the transmitting side. Thus, the information bit sequence for the desired channel is taken out and is demodulated. Because the transmission frequency band of the CDMA system is wide, the CDMA system is strong in the selective fading on multi-path, so that information for a lot of channels can be transmitted in the identical frequency band. Also, there is secrecy that it is not possible to demodulate the information if the same spreading code as on the transmitting side is not used. Therefore, the CDMA system is suitable for a multiple access system for a mobile communication system.

FIG. 1 is a block diagram of an example of a conventional demodulating circuit of a receiver in the above-mentioned CDMA system. In FIG. 1, a reception signal as a digital signal with a predetermined frame format is inputted to a path searching circuit 11 and an inversely spreading circuit 12. For example, when the CDMA system is applied to a mobile communication system, this inputted reception signal is the signal to have been transmitted in radio from the mobile terminal and to have been received by a base station. The reception signal is a modulated wave obtained by carrying out phase shift keying (PSK) modulation to a carrier. Moreover, the reception signal is a signal in which one symbol is spread over a plurality of chips with the spreading code. Each of slots of this reception signal is a unique word composed of real part (I signal) of data and an imaginary part (Q signal) of a fixed pattern, as shown in FIGS. 2A and 2B. Each of symbols of the I signal and the Q signal is spread over the plurality of chips with the spreading code. The format shown in FIGS. 2A and 2B is defined in 3GPP (3rd Generation Partnership Project).

Supposing that the inversely spreading circuit 12 of FIG. 1 has M (M is an integer equal to or more than 2) correlating units, the path searching circuit 11 of FIG. 1 produces a delay profile from the above-mentioned inputted reception signal, and allocates M paths of the detected and separated paths to the inversely spreading circuits 12. The inversely spreading circuit 12 inversely spreads the reception signal for each path using a delay quantity obtained from the delay profile calculated by the path searching circuit 11. Through the inverse spreading, the data in each path is changed from the chip unit base to the symbol unit base.

The data outputted from the inversely spreading circuit 12 is supplied to the RAKE synthesizing circuit 13. The estimation of the channel and phase compensation are carried out here for every data in each path. After that, a weighting operation is carried out for a maximum S/N (signal-to-noise) ratio in the RAKE synthesizing circuit and then data for the respective paths are summed. The signal taken out from the RAKE synthesizing circuit 13 is supplied to a decoder 14 and is decoded through metric calculation.

By the way, when the above-mentioned CDMA system is applied to the mobile communication system, an error correcting code which has a high coding gain is introduced. In this case, it is known that the coding gain is maximum in the decoder of the demodulating circuit, when the distortion of the reception signal cancels a time change or fluctuation (for example, "Digital Communication Receivers", (pp. 690–697) by H. Meyr).

However, in the conventional demodulating circuit shown in FIG. 1, the weighting operation is carried out in the RAKE synthesizing circuit 13 such that a S/N (signal-to-noise) ratio after synthesis is maximized. In this case, because the weighting operation to a synthetic output signal is not carried out, the S/N ratio of the input signal of the decoder 14 is not enough large. Therefore, the value of the metric calculation has sometimes received a time fluctuation at the time of the metric calculation by the decoder 14.

Therefore, conventionally, a demodulating circuit is proposed in Japanese Laid Open Patent Application (JP-A-Heisei 10-173629), in which the path timing which should be synthesized is stably extracted, a RAKE synthesis is reliably realized and demodulation with a low error rate can be carried out, when RAKE synthesis is carried out. In the conventional demodulating circuit, an autocorrelation value of the spreading code is calculated. Numerical values obtained by synthesizing a calculation result and a measured reception quality measurement result from the RAKE synthesis signal are set as upper and lower thresholds for an error range of the autocorrelation value. Also, the cross-correlation value of the spreading code and the reception signal allocated for a mobile station itself is calculated. The cross-correlation value and the above-mentioned upper and lower thresholds are compared by the comparing means. If the cross-correlation value is between the upper and lower thresholds, the cross-correlation value is regarded as an invalid correlation value and a corresponding weighting coefficient of a weighting section is set to "0". The weighting section weights the signal obtained by inversely spreading the reception signal using the spreading code. If the cross-correlation value is out of the range between the upper and lower thresholds, the cross-correlation value is regarded as an effective correlation value and the above-mentioned weighting coefficient is set to a predetermined value. After that, the output signals of the weighting section are added, synthesized and outputted to the decoder as the RAKE synthesis signal.

In the conventional demodulating circuit, a wrong timing is never extracted based on the autocorrelation of the spreading code. When the effective reception signal exists in the place of the wrong timing extracted based on the autocorrelation, a threshold is set based on the autocorrelation value, because the cross-correlation value of the reception signal is different from the autocorrelation value of the spreading code. As a result, influence of the autocorrelation value is excluded, and the RAKE synthesis can be carried out, the error rate of the decoder can be suppressed low.

However, the above-mentioned conventional demodulating circuit is complex in the circuit structure, because circuits are necessary such as a section for calculating the autocorrelation value of the spreading code, a section for calculating the quality (SIR) of the reception signal from the signal obtained through RAKE synthesis, and a comparing section for comparing the cross-correlation value and the autocorrelation value of the reception signal.

In conjunction with the above description, a spectrum spreading communication receiver is disclosed in Japanese Laid Open Patent Application (JP-A-Heisei 8-237171). In this reference, a plurality of sets of antenna, correlator and Rake synthesizing circuit are provided. The levels of the output signals of the RAKE synthesizing circuits are compared so as to select one of the output signals having the highest level and the selected output signal is outputted to a demodulating circuit.

Also, a CDMA demodulating circuit is disclosed in Japanese Laid Open Patent Application (JP-A-Heisei 8-335899). In this reference, the output of a phase error compensating section (107) is carried out in a pilot symbol period. It is held for a few symbol periods by a timing adjust function section (110). By using the held phase compensation value, an error generating circuit (109) generates an error vector for every information symbol from signal vectors before and after identification determination. The error vector is sequentially supplied to a tap coefficient control section (111) in the symbol period. The tap coefficient control section (111) updates the tap coefficients of an orthogonal filter in the symbol period. Thus, the tap coefficients are converged in a short time.

SUMMARY OF THE INVENTION

Therefore, an object of the present invention is to provide a receiver for a demodulating method and circuit, in which a decode gain is maximized and a RAKE synthesis signal can be demodulated while an error rate is suppressed low.

Also, another object of the present invention is to provide a receiver for a demodulating method and circuit, in which it is possible to improve the performance of a receiver which receives a reception signal of the CDMA system with a simple structure.

In order to achieve an aspect of the present invention, a receiver includes inversely spreading circuit, a RAKE synthesizing circuit, a noise measuring circuit, a weighting circuit and a decoder. The inversely spreading circuit inversely spreads a reception signal for every path using a spreading code to produce path data signals for paths. The RAKE synthesizing circuit synthesizes the path data signals to output a RAKE synthesis signal while carrying out a weighting operation for every path such that the RAKE synthesis signal has a maximum S/N ratio. The noise measuring circuit measures a noise level of each of the path data signals, and calculates a total noise amount for the paths from the measured noise levels. The weighting circuit carries out a weighting operation of the RAKE synthesis signal based on the total noise amount to produce a weighted signal such that a time change of distortion in the RAKE synthesis signal is cancelled. The decoder decodes the weighted signal to produce an information sequence.

Here, the noise measuring circuit may calculate a reciprocal of a summation of the measured noise levels, and the weighting circuit may multiply the RAKE synthesis signal by the reciprocal of the summation of the measured noise levels. Instead, the noise measuring circuit may calculate a summation of the measured noise levels, and the weighting circuit may divide the RAKE synthesis signal with a reciprocal of the summation of the measured noise levels.

Also, the noise measuring circuit may include a plurality of noise measuring devices, each of which is provided for a corresponding path and measures the noise level of one of the data path signals for the corresponding path, and a summing circuit summing the measured noise levels to output the total noise amount. In this case, each of the plurality of noise measuring devices may include a channel estimator estimating a distortion of a corresponding one of the data path signals, a divider dividing the corresponding data path signal by the estimated distortion to produce a divided signal, a first square circuit calculating a first square of the divided signal, a second square circuit calculating a second square of the estimated distortion, a subtracter subtracting one from the first square to produce a subtracted signal, a multiplier multiplying the subtracted signal by the second square, and an averaging circuit averaging the multiplying results by the multiplier.

Also, the receiver may be a mobile terminal, and the reception signal may be a signal from a mobile terminal of a CDMA system.

Also, the receiver may use a maximum ratio RAKE synthesis.

In another aspect of the present invention, a method of demodulating a received radio signal is attained by inversely spreading the radio signal for every path using a spreading code to produce path data signals for paths; by carrying out RAKE synthesis of the path data signals to generate a RAKE synthesis signal; by carrying out a weighting operation for every path such that the RAKE synthesis signal has a maximum S/N ratio; by measuring a noise level of each of the path data signals, and calculates a total noise amount for the paths from the measured noise levels; by weighting the RAKE synthesis signal based on the total noise amount to produce a weighted signal; and by decoding the weighted signal to produce an information sequence.

The weighting may be attained to cancel a time change of distortion in the RAKE synthesis signal.

Also, the carrying out RAKE synthesis and the carrying out a weighting operation may be simultaneously carried out.

Also, the measuring may be attained by calculating a reciprocal of a summation of the measured noise levels, and the weighting may be attained by multiplying the RAKE synthesis signal by the reciprocal of the summation of the measured noise levels. Instead, the measuring may be attained by calculating a summation of the measured noise levels, and the weighting may be attained by dividing the RAKE synthesis signal with a reciprocal of the summation of the measured noise levels.

Also, the measuring may be attained by measuring the noise level of each of the data path signals, and by summing the measured noise levels over the paths to output the total noise amount. In this case, the measuring the noise level may be attained by estimating a distortion of a corresponding one of the data path signals, by dividing the corresponding data path signal by the estimated distortion to produce a divided signal, by calculating a first square of the divided signal, by calculating a second square of the estimated distortion, by subtracting one from the first square to produce a subtracted signal, by multiplying the subtracted signal by the second square, and by averaging the multiplying results by the multiplier.

Also, the receiver may be a mobile terminal, and the reception signal may be a signal from a mobile terminal of a CDMA system.

Also, the receiver may use a maximum ratio RAKE synthesis.

DESCRIPTION OF THE PREFERRED EMBODIMENTS

Hereinafter, a receiver of the present invention will be described with reference to the attached drawings.

Figure 1:
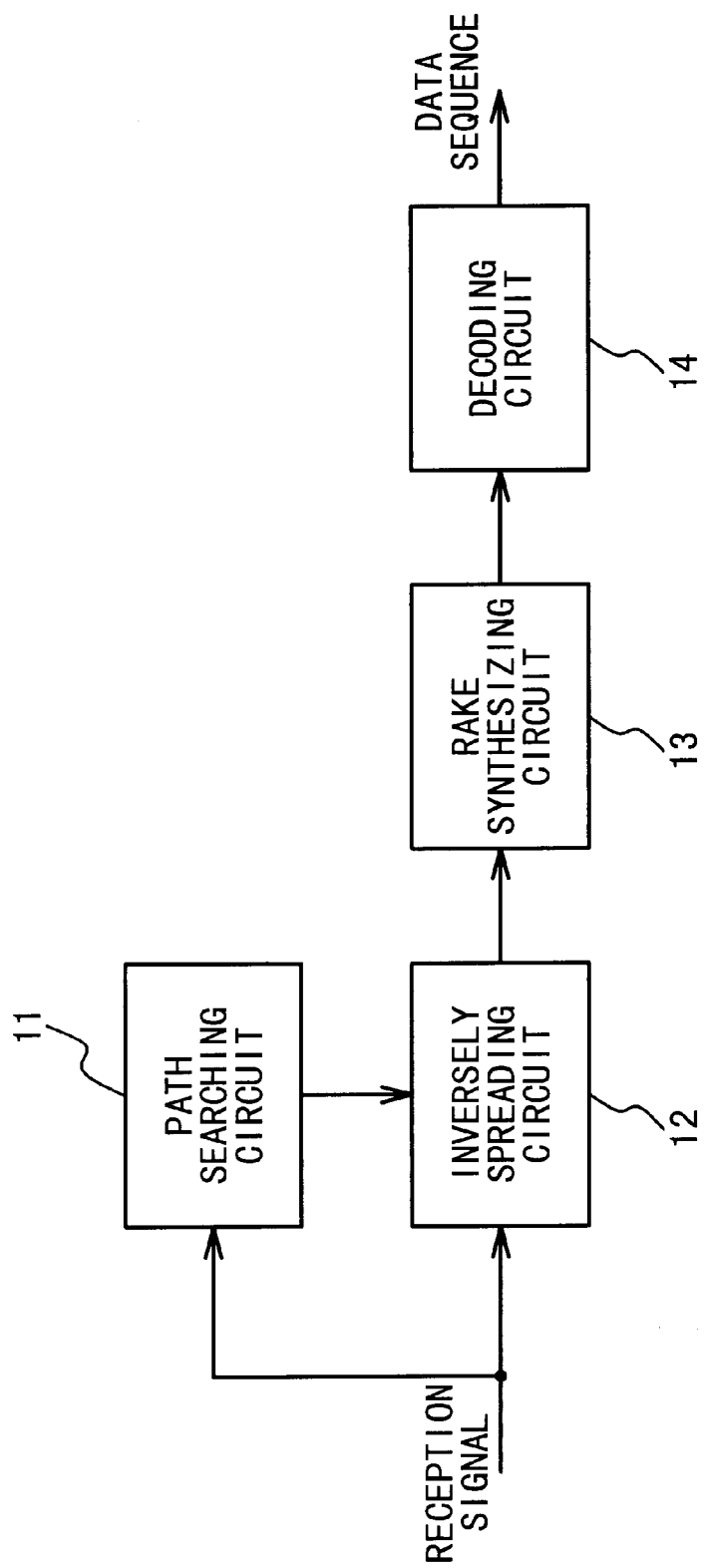
FIG. 1 is a block diagram showing the structure of an example of a conventional receiver.
Figure 3:
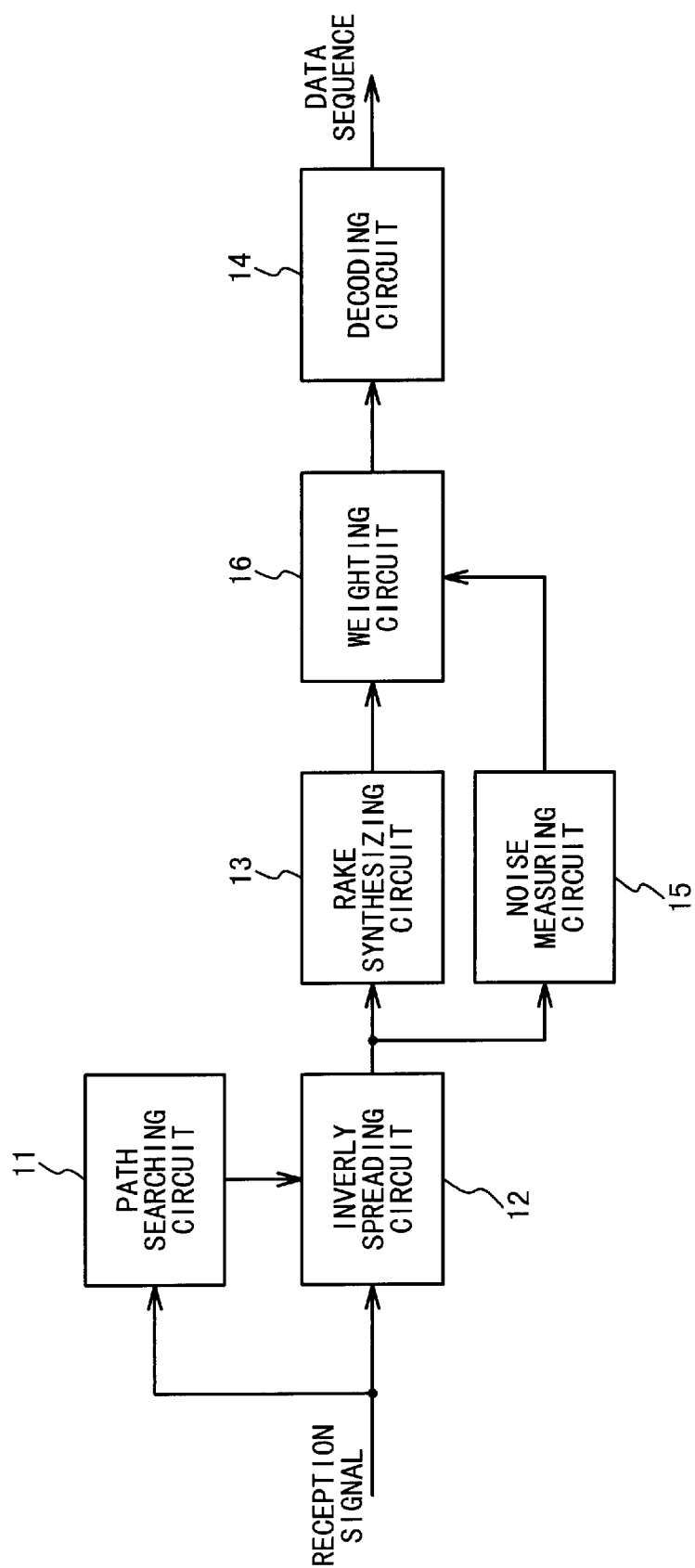
FIG. 3 is a block diagram showing the structure of a receiver according to an embodiment of the present invention.

FIG. 3 is a block diagram showing the structure of a demodulating circuit of the receiver according to an embodiment of the present invention. Referring to FIG. 3, the same components as those in FIG. 1 are allocated with the same reference numerals, respectively. The embodiment shows a demodulating circuit of a base station, for example. The demodulating circuit communicates with mobile terminals in a mobile communication system in which the mobile terminal communicates with a counter terminal through the base station and a network.

Figure 2A:
FIGS. 2A and 2B are diagrams showing the format of data and a unique word.
Figure 2B:
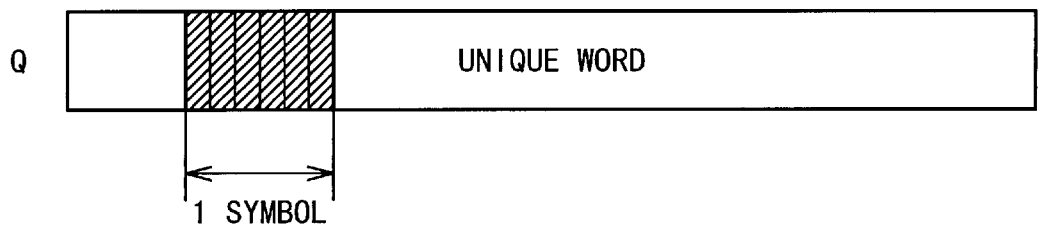

Referring to FIG. 3, a reception signal is supplied to a path searching circuit 11 and an inversely spreading circuit 12. The reception signal includes a unique word composed of a real part (I signal) of data and an imaginary part (Q signal) of a known fixed pattern, as shown in FIGS. 2A and 2B. Each of symbols of the I signal and the Q signal is spread over a plurality of chips with a spreading code. That is, the reception signal is a PSK modulation wave in which a frequency spectrum is spread with the spreading code.

The path searching circuit 11 is a circuit for the synchnization establishment. As the path searching circuit, there is conventionally known a circuit using a sliding correlating unit and a circuit using a matched filter. In this example, either of them is usable. For example, in the circuit using the sliding correlating unit, a spreading code (a PN series) with a suitable phase and a reception signal are multiplied on a chip unit basis. The multiplication result is integrated over one period of the spreading code. If the integration value is equal to or larger than a predetermined threshold, the point is selected as a synchronization point. If the integration value is lower than the threshold, the phase of the spreading code is shifted a little bit and the phase-shifted spreading code is multiplied by the reception signal again. The multiplication result is integrated. When the multiplication with the reception signal and the integration are carried out for one period of the spreading code in this way, a peak of the correlation can be detected somewhere when the transmission signal has been spread with the same spreading code as that on the receiving side and then has been received by the receiving side. Then, the phase of a spreading code outputted from a spreading code generator is adjusted to the position of the peak.

In the circuit using the matched filter, a reception signal is supplied to a shift register. A signal is outputted from a bit output terminal of the shift register corresponding to a positive value of the spreading code and is added by an first adder. A signal is outputted from the bit output terminal corresponding to a negative value of the spreading code and then is added by the second adder. In the circuit, those addition outputs are synthesized and the peak determination of the correlation value is carried out.

A transmission signal is reflected by a building and so on or is subjected to diffraction and scattering. Then, the transmission signal is received by a receiver via some routes (paths). Therefore, the above-mentioned reception signal is a signal in which signals with different delay times are superimposed. Therefore, the path searching circuit 11 carries out the above-mentioned correlation peak determination to each of M (M is an integer equal to or larger than 2) paths with different delay times. In this way, the path searching circuit 11 carries out a correlation value peak determination to each of the M paths and supplies a signal indicative of the detected timings to the inversely spreading circuit 12.

Figure 4:
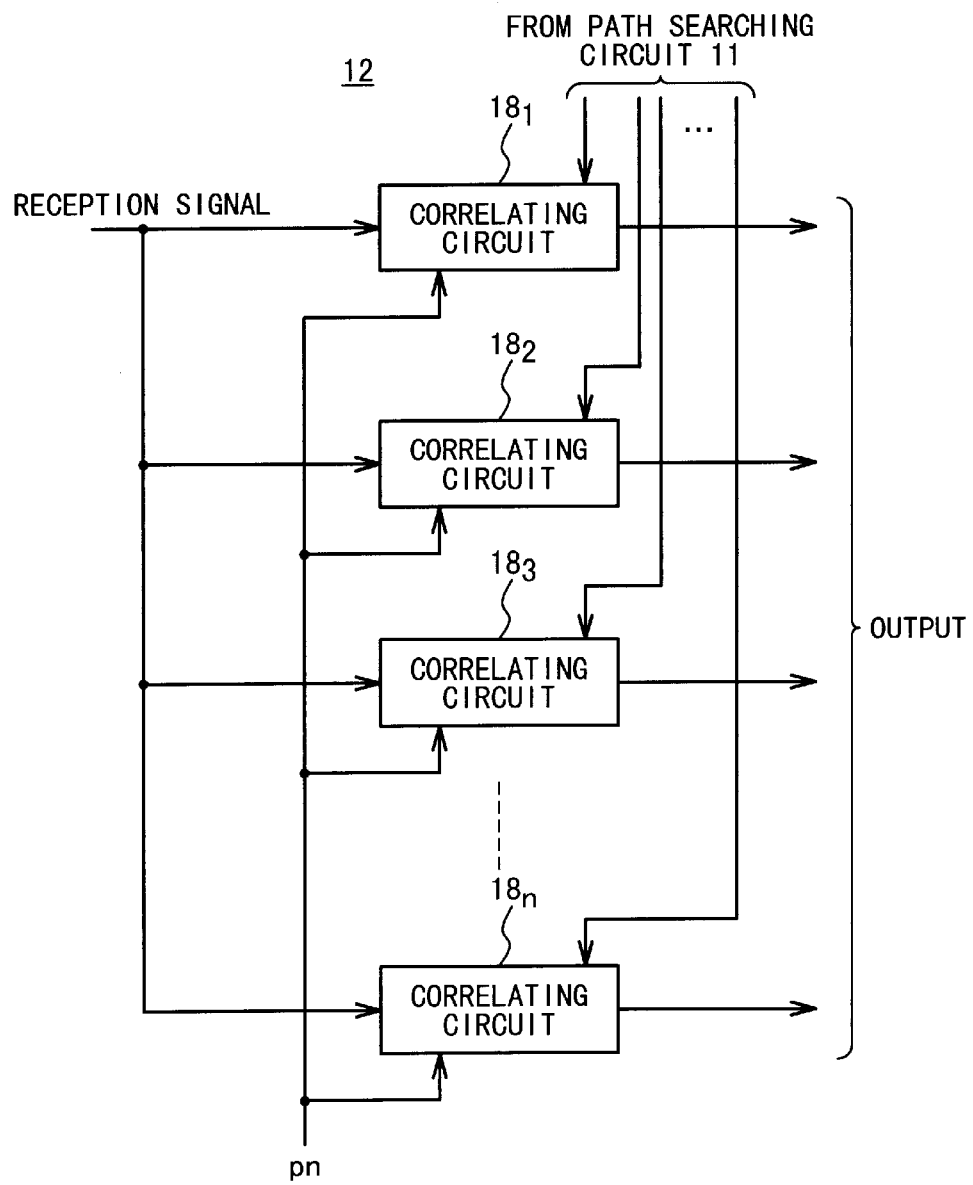
FIG. 4 is a block diagram showing the structure of an inversely spreading circuit in the receiver shown in FIG. 3.

FIG. 4 shows a block diagram of an example of the inversely spreading circuit 12. The inversely spreading circuit 12 shown in FIG. 3 is composed of M correlating units 181 to 18M. The correlation between a spreading code pn common to them and the reception signal is calculated at the timing of each path from the path searching circuit 11. The calculation of the correlation is called inverse spreading. The signals from of the M correlating units 181 to 18M are outputted as data in the respective M paths. The data on the respective paths are converted from the data of the chip unit basis into the data of the symbol unit basis through the inverse spreading.

It should be noted that each of the M correlating units 181 to 18M has a correlator for the I signal of the reception signal and a correlator for the Q signal. A first spreading code is supplied in common to the M correlators for the I signal. A second spreading code is supplied in common to the M correlators for the Q signal. Also, the M correlating units 181 to 18M as M sets of two correlators are provided for the number of users receiving service from the base station. However, as shown in FIG. 4, the I signal and the Q signal will be collectively described for simple description, unless being especially noted in this specification.

Figure 5:
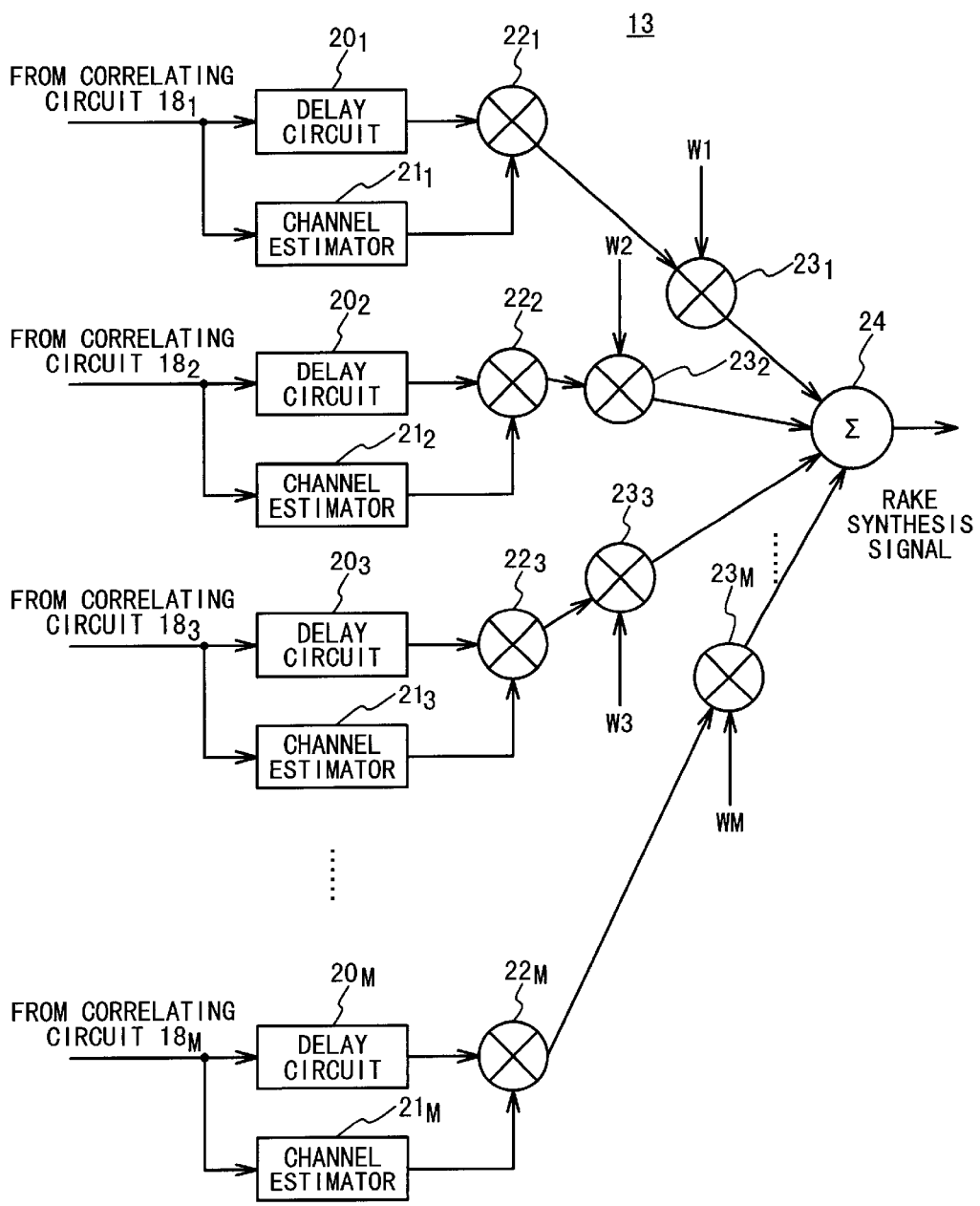
FIG. 5 is a block diagram showing the structure of a RAKE synthesizing circuit in the receiver shown in FIG. 3.
Figure 7:
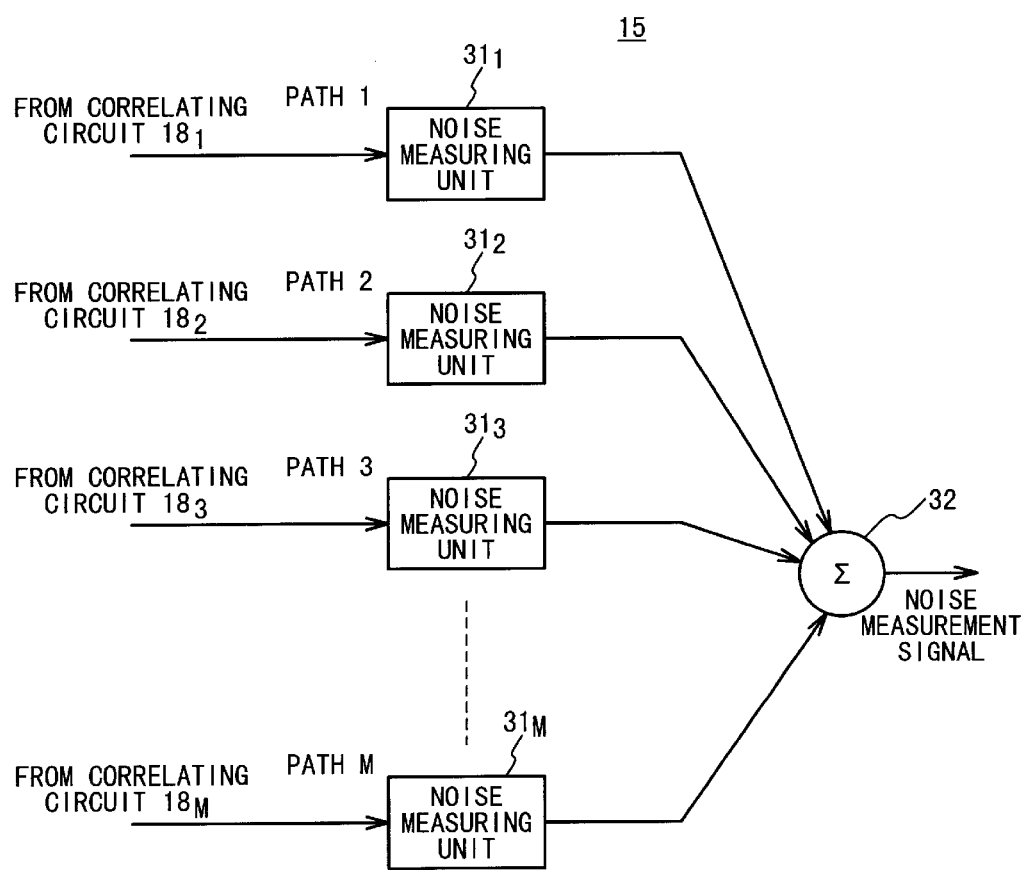
FIG. 7 is a block diagram showing the structure of a noise measuring circuit in the receiver shown in FIG. 3.

The data signals outputted from the inversely spreading circuit 12 are supplied to the RAKE synthesizing circuit 13 with the structure shown in FIG. 5 and the noise measuring circuit 15 with the structure shown in FIG. 7, respectively. In this embodiment, the noise measuring circuit 15 is provided and the weighting circuit 16 is provided between the RAKE synthesizing circuit 13 and the decoder 14.

FIG. 5 shows a block diagram of an example of the RAKE synthesizing circuit 13. In FIG. 5, the data signals for the paths outputted from the M correlating units 181 to 18M of the inversely spreading circuit 12 are supplied to channel estimators 211 to 21M provided for the respective paths. The channel estimators 211 to 21M detect distortion components of the respective paths.

Figure 6:
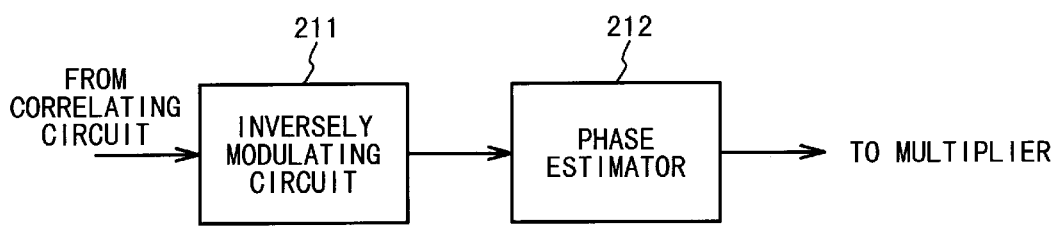
FIG. 6 is a block diagram showing the structure of a channel estimator in the receiver shown in FIG. 5.

The channel estimators 211 to 21M have the same structure. For example, as shown in the block diagram of FIG. 6, the channel estimator is composed of an inversely modulating unit 211 and a phase ran estimator 212. The inversely modulating unit 211 multiplies an input signal by the unique word to carry out inverse modulation and supplies an inverse modulation resultant signal to the phase estimator 212. The phase estimator 212 estimates the phase of each symbol of inverse modulation signal and outputs as a distortion component.

Returning to FIG. 5 again, the above-mentioned distortion component is multiplied by the data signal outputted from a corresponding one of the correlating units 181 to 18M. The data signal is delayed by a corresponding one of delay circuits 201 to 20M to have a delay time for the processing time of a corresponding one of the channel estimators 211 to 21M. The delay circuits 201 to 20M are used to adjust timings of multiplication in the multipliers 221 to 22M for the phase compensation. The respective output signals of the multipliers 221 to 22M are separately supplied to multipliers 231 to 23M. Also, weighting coefficients W1 to WM are supplied to the multipliers 231 to 23M. The multipliers 231 to 23M multiplies the output signals from the multipliers 221 to 22M by the weighting coefficients W1 to WM, respectively, such that a S/N ratio after synthesis is maximized.

The output data of the respective paths outputted from the multipliers 231 to 23M are supplied to an adder 24 and added or synthesized there, and the addition result is outputted as a RAKE synthesis signal. The structure of the RAKE synthesizing circuit 13 itself of FIG. 5 is conventionally known.

FIG. 7 is a block diagram showing an example of the noise measuring circuit 15. In FIG. 7, the data signals of the respective paths outputted from the M correlating units 181 to 18M of the inversely spreading circuit 12 are supplied to the noise measuring units 311 to 31M which are provided for the respective paths. Noise is measured and detected here for every path, and each measurement result is supplied to the adder 32 and an addition or synthesization is carried out there. The addition result is supplied to the weighting circuit 16 of FIG. 3 as a noise measurement signal.

Figure 8:
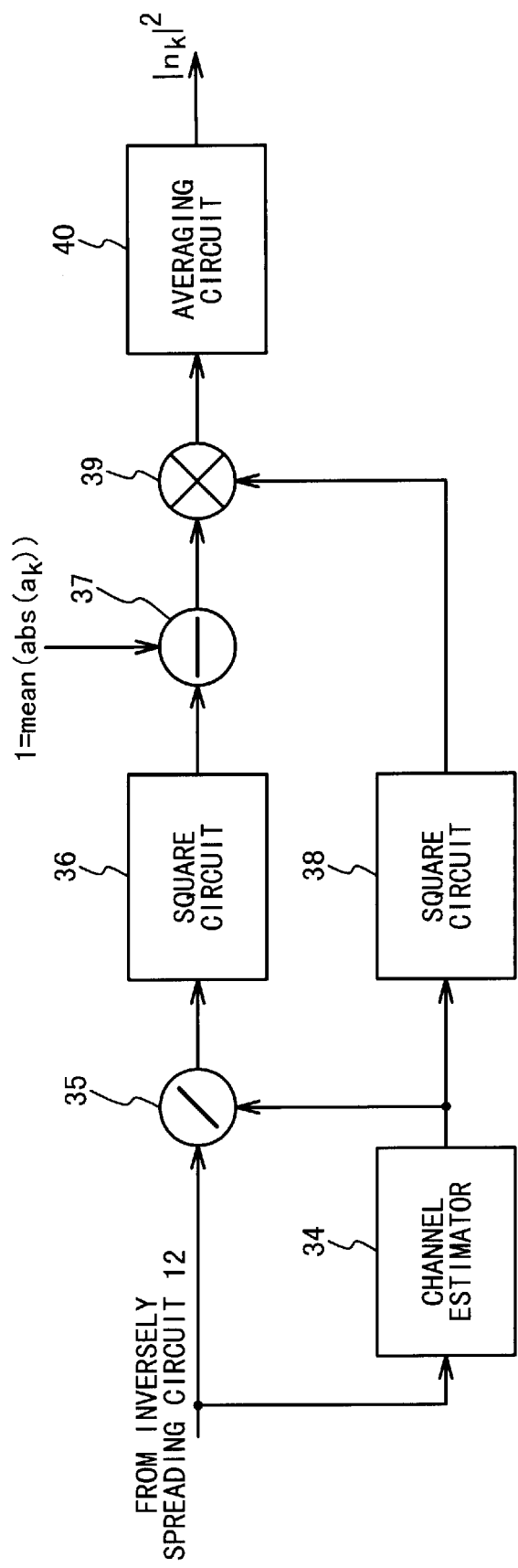
FIG. 8 is a block diagram showing the structure of a noise measuring unit in the receiver shown in FIG. 7.

FIG. 8 shows a block system of an example of the optional one in the noise measuring units 311 to 31M. As shown in FIG. 8, the noise measuring unit 31k in the k-th finger or path is supplied with the output signal from the inversely spreading circuit 12. The noise measuring unit is composed of a channel estimator 34, a dividing unit 35, square circuits 36 and 38, a subtracting unit 37, a multiplier 39 and a an averaging circuit 40. The channel estimator 34 carries out estimation of a channel and outputs a distortion component for fading. The dividing unit 35 carries out division of the output signal from the inversely spreading circuit 12 by the output signal from the channel estimator 34. The square circuit 36 is a circuit calculates the square of an absolute value of the value of the output signal of the dividing unit 35. The square circuit 38 is a circuit which calculates the square of the absolute value of the value of the output signal of the channel estimator 34. The subtracting unit 37 subtracts "1" from the output signal of the square circuit 36. The multiplier 39 multiplies the output from the subtracting unit 37 by the output from the square circuit 38. The averaging circuit 40 calculates an average of the signal taken out from the multiplier 39. The signal outputted from the averaging circuit 40 is supplied to the adder 32 of FIG. 7 and is synthesized there.

Figure 9:
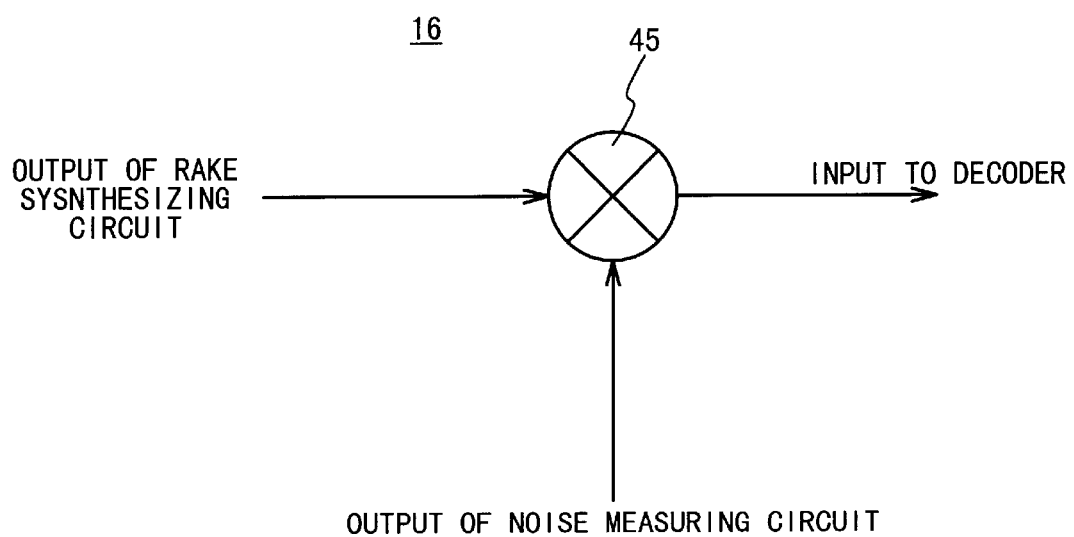
FIG. 9 is a block diagram showing the structure of a weighting circuit in the receiver shown in FIG. 3.

The weighting circuit 16 of FIG. 3 is composed of a multiplier 45 as shown in FIG. 9. The weighting circuit 16 multiplies the RAKE synthesis signal from the RAKE synthesizing circuit 13 by the noise measurement signal from the noise measuring circuit 15 as the weighting coefficient. The weighting circuit 16 outputs the signal of the multiplication result to the decoder 14. The RAKE synthesis signal weighted by the weighting circuit 16 is a demodulation signal in which noise is removed or reduced, as described later. The decoder 14 carries out the decoding operating to the demodulation signal outputted from the weighting circuit 16 and outputs an information signal which is subjected to error correction.

For example, the decoder 14 may be a known Viterbi decoder. The decoder 14 calculates branch metric from the input signal, and sums the branch metric for every clock to calculate path metric. The decoder 14 selects the data sequence having the highest reliability from a path memory such that the path metric is the smallest. The path memory stores a plurality of candidate sequences and outputs as the decode data the candidate sequence selected in accordance with the path metric value.

Next, the operation of the main section of this embodiment will be further described detail. The RAKE synthesizing circuit 13 is associated with the M paths as shown in FIG. 5. It is supposed that the input signal to the RAKE synthesizing circuit 13 in the k-th finger (path) of the M paths is:

$$c_k \cdot a(t) + n_k \tag{1}$$

where a(t) is a transmission signal, ck is fading, $n_k$ is noise and each variable is a complex number.

The output signal of the channel estimator 21k of the k-th finger is expressed as $1/c_k$ when the estimation is ideally carried out. Therefore, in an ideal case, the multiplier 22k of the k-th finger is shown as:

$$\{c_k \cdot a(t) + n_k\}/c_k \tag{2}$$

The output signal of the multiplier 22k is subjected to the phase compensation. Next, the output signal of the multiplier 22k is supplied to the multiplier 23k and multiplied by the weighting coefficient Wk which maximizes the S/N ratio after synthesis. Therefore, the output signal of the multiplier 22k is shown as:

$$(c_k \cdot a(t) + n_k) \cdot W_k / c_k \tag{3}$$

where the above-mentioned weighting coefficient $W_k$ is $|c_k|^2$. Supposing that the fading is a complex value of $c_k$ and a complex conjugate is $c_k^*$, $$c_k \cdot c_k^* = |ck|^2 \tag{4}$$

Therefore, it is possible to show the output signal of the multiplier 23k after weighting operation as the following equation.

$$\begin{aligned}(c_k \cdot a(t) + n_k) \cdot W_k / c_k &\\ = (c_k \cdot a(t) + n_k) \cdot c_k * &\\ = (|c_k|^2 a(t) + n_k \cdot c_k *\end{aligned} \tag{5}$$

Since the adder 24 adds or synthesizes the respective output signals of the multipliers 231 to 23M for the M paths, the RAKE synthesis signal outputted from the adder 24 can be expressed by the following equation (6).

$$\sum_{k=1}^{M} \{|c_k|^2 a(t) + n_k \times c_k^*\} = a(t) \times \sum_{k=1}^{M} |c_k|^2 + \sum_{k=1}^{M} (n_k \times c_k^*) \tag{6}$$

Because the RAKE synthesis signal is inputted to the decoder 14, it is supposed that the input signal of the decoder 14 is expressed by the following equation (7) by transforming the equation (6).

$$\hat{a}(t) = a(t) + \frac{\sum_{k=1}^{M}(n_k \times c_k^*)}{\sum_{k=1}^{M}|c_k|^2} \quad (7)$$

In this case, the branch metric in the decoder 14 is shown by the following equation (8) using the equation (6).

$$|\hat{a}(t) - b(t)|^2 = |\hat{a}(t)|^2 = \left|\frac{\sum_{k=1}^{M}(n_k \times c_k^*)}{\sum_{k=1}^{M}|c_k|^2}\right|^2 \quad (8)$$

It should be noted that b(t) in the (8) equation is a branch value in the decoder 14. Also, the equation (8) is an equation when b(t)=a(t), i.e., a right path selection is carried out.

When noise components have no correlation with each other, the equation (8) can be rewritten into the following equation (9).

$$|\hat{a}(t) - b(t)|^2 \cong |\hat{a}(t)|^2 = \frac{\sum_{k=1}^{M}|n_k|^2 \cdot \sum_{k=1}^{M}|c_k|^2}{\left|\sum_{k=1}^{M}|c_k|^2\right|^2} = \frac{\sum_{k=1}^{M}|n_k|^2}{\sum_{k=1}^{M}|c_k|^2} \quad (9)$$

Therefore, it is sufficient that the branch metric is a constant value with no relation to t in order to cancel the time fluctuation by the branch metric for the optimization of the decoding gain. Therefore, the following equation (10) should be satisfied.

$$BM = \frac{\sum_{k=1}^{M}|n_k|^2}{\sum_{k=1}^{M}|c_k|^2}|\hat{a}(t) - b(t)|^2 \quad (10)$$

In the equation (10), $$|\hat{a}(t)-b(t)|^2 a = |a(t)|^2 - 2 \cdot a(t) \cdot b(t) + |b(t)|^2 \quad (11)$$

Since the value of this equation (11) is summation of errors, it is desirable that the value is minimum. Therefore, in order to make the left side of the equation (11) minimum, it is necessary to make the following term in the right side of the equation (11) maximum.

$$\hat{a}(t) \times b(t) \quad (12)$$

For this purpose, it is necessary to multiply the input signal to the decoder 14 by the following coefficient on the right side of branch metric of the equation (10)

$$\frac{\sum_{k=1}^{M}|c_k|^2}{\sum_{k=1}^{M}|n_k|^2} \quad (13)$$

The input signal to the decoder 14 which is obtained by multiplying the input RAKE synthesis signal to the decoder 14 shown by the equation (3) by the weighting coefficient is obtained as the following equation (14) from the equation (6).

$$\frac{\sum_{k=1}^{M}|c_k|^2}{\sum_{k=1}^{M}|n_k|^2} \cdot \hat{a}(t) = \frac{1}{\sum_{k=1}^{M}|n_k|^2}\left[a(t) \cdot \sum_{k=1}^{M}|c_k|^2 + \sum_{k=1}^{M}(n_k \cdot c_k^*)\right] \quad (14)$$

When the right side of the above-mentioned equation (14) and the RAKE synthesis signal of the equation (5) are compared, it is necessary to multiply the RAKE synthesis signal by $$\frac{1}{\sum_{k=1}^{M}|n_k|^2} \quad (15)$$

as the weighting coefficient.

Next, the generation of the weighting coeffcient will be described. The noise measuring unit 31$k$ shown in the FIG. 7 of the k-th finger of the noise measuring circuit 15 is supplied with the following signal from the correlating unit 18$k$ of the inversely spreading circuit 12, as the input signal of the RAKE synthesizing circuit 13 of the k-th finger $$c_k \cdot a(t) + n_k \quad (16)$$

The channel estimator 34 takes out a fading component $c_k$ to supplies to the dividing unit 35. The dividing operation of the above-mentioned input signal and the fading component $c_k$ is carried out so as to obtain a signal expressed as follows.

$$a(t)+(n_k/c_k) \quad (17)$$

Also, the fading component $c_k$ is supplied to the square circuit 38 and is used to calculate the square value of the absolute value.

The output signal of the dividing unit 35 is supplied to the square circuit 36 and is used to calculate the square value of the absolute value as follows.

$$|a(t)+(n_k/c_k)|^2 \quad (18)$$

After calculation of the square value, the calculation result is supplied to the subtracting unit 37 and the following calculation is carried out there.

$$\left|a(t) + \frac{n_k}{c_k}\right|^2 - 1 \cong |a(t)|^2 + \left|\frac{n_k}{c_k}\right|^2 - 1 = \left|\frac{n_k}{c_k}\right|^2 \quad (19)$$

The output signal of the subtracting unit 37 shown by the above-mentioned equation (19) is supplied to the multiplier 39 together with the signal outputted from the square circuit 38. The output signal from the subtracting unit 37 and the signal from the square circuit 38 are multiplied there to produce a multiplication signal shown as $|c_k|^2$. Then, the multiplication signal is supplied to the adder 32 of FIG. 7 through the averaging circuit 40.

The adder 32 adds and synthesizes the reciprocal value of the output signals $|c_k|^2$ from the noise measuring circuit for the M paths, and generates the noise measurement signal shown by the equation (15).

The weighting circuit 16 (the multiplier 45 of FIG. 9) of FIG. 3 adds and synthesizes the square values of the noise components for the above-mentioned respective paths from the noise measuring circuit 15 to the RAKE synthesis signal of the equation (5) from the RAKE synthesizing circuit 13 and multiplies the addition result by the noise measurement signal shown by the equation (15) as the weighting coefficient. Thus, the multiplication result shown by the equation (13) is produced and supplied to the decoder 14.

By this, the decoding gain can be made maximum in the decoder 14 without influence of the time fluctuation to the distortion of the input signal at the metric calculation, and thus as known from the above-mentioned literature. Also, it is possible to keep a bit error rate (BER) low after the error correction. Also, because the means for calculation of the spreading code autocorrelation, comparing means, reception level measuring means are unnecessary, the circuit structure can be simplified.

It should be noted that the present invention is not limited to the above-mentioned embodiment. For example, the signal format may be another format in which data and the unique word are multiplexed in time, other than the format of FIGS. 2A and 2B. Also, the weighting coefficient calculating method can be applied to the system using a maximum ratio RAKE synthesis in addition to CDMA. Also, in the above embodiments, the weighting coefficient which is expressed by the equation (15) is generated by the adder 32 of the noise measuring circuit 15. However, the structure may be employed in which the adder 32 calculates a value of the denominator of the equation (15) and the RAKE synthesis signal is divided by the noise measurement signal in the weighting circuit 16.

As described above, according to the present invention, the noise of the inversely spread signal is measured for every path. The noise measurement results are added and synthesized to generate a noise measurement signal. The weighting coefficient is calculated based on the noise measurement signal to cancel the time fluctuation of the distortion of the input signal at the metric calculation in the decoder. The weighting coefficient is multiplied by the RAKE synthesis signal. Therefore, the gain of the decoder can be made maximum. Also, the demodulation can be carried out, while the bit error rate (BER) can be suppressed low, compared with the conventional example. Thus, the receiver performance can be improved.

Also, according to the present invention, the noise of the inversely spread signal is measured for every path, and a weighting coefficient is calculated from the measurement results. Therefore, means of calculating the autocorrelation value of the spread code, means for calculating the quality (SIR) of the reception signal from the signal that RAKE synthesis, and comparing means for comparing the cross-correlation value and the autocorrelation value of the reception signal can be made unnecessary, and the circuit structure can be simplified compared with the conventional.

What is claimed is:

1. A receiver comprising:
   inversely spreading circuit which inversely spreads a reception signal for every path using a spreading code to produce path data signals for paths;
   a RAKE synthesizing circuit which synthesizes said path data signals to output a RAKE synthesis signal while carrying out a weighting operation for every path such that said RAKE synthesis signal has a maximum S/N ratio;
   a noise measuring circuit which measures a noise level of each of said path data signals, and calculates a total noise amount for said paths from said measured noise levels;
   a weighting circuit which carries out a weighting operation of said RAKE synthesis signal based on said total noise amount to produce a weighted signal such that a time change of distortion in said RAKE synthesis signal is cancelled; and
   a decoder which decodes said weighted signal to produce an information sequence.

2. The receiver according to claim 1, wherein said noise measuring circuit calculates a reciprocal of a summation of said measured noise levels, and
   said weighting circuit multiplies said RAKE synthesis signal by said reciprocal of said summation of said measured noise levels.

3. The receiver according to claim 1, wherein said noise measuring circuit calculates a summation of said measured noise levels, and
   said weighting circuit divides said RAKE synthesis signal with a reciprocal of said summation of said measured noise levels.

4. The receiver according to claim 1, wherein said noise measuring circuit includes:
   a plurality of noise measuring devices, each of which is provided for a corresponding path and measures said noise level of one of said data path signals for the corresponding path; and
   a summing circuit summing said measured noise levels to output said total noise amount.

5. The receiver according to claim 4, wherein each of said plurality of noise measuring devices includes:
   a channel estimator estimating a distortion of a corresponding one of said data path signals;
   a divider dividing said corresponding data path signal by said estimated distortion to produce a divided signal;
   a first square circuit calculating a first square of said divided signal;
   a second square circuit calculating a second square of said estimated distortion;
   a subtracter subtracting one from said first square to produce a subtracted signal;
   a multiplier multiplying said subtracted signal by said second square; and
   an averaging circuit averaging the multiplying results by said multiplier.

6. The receiver according to claim 1, wherein said receiver is a mobile terminal.

7. The receiver according to claim 6, wherein said reception signal is a signal from a mobile terminal of a CDMA system.

8. The receiver according to claim 1, wherein said receiver uses a maximum ratio RAKE synthesis.

9. A method of demodulating a received radio signal, comprising:
   inversely spreading said radio signal for every path using a spreading code to produce path data signals for paths;
   carrying out RAKE synthesis of said path data signals to generate a RAKE synthesis signal;
   carrying out a weighting operation for every path such that said RAKE synthesis signal has a maximum S/N ratio;
   measuring a noise level of each of said path data signals, and calculates a total noise amount for said paths from said measured noise levels;
   weighting said RAKE synthesis signal based on said total noise amount to produce a weighted signal; and
   decoding said weighted signal to produce an information sequence.

10. The method according to claim 9, wherein said weighting includes:

canceling a time change of distortion in said RAKE synthesis signal.

11. The method according to claim 9, wherein said carrying out RAKE synthesis and said carrying out a weighting operation are simultaneously carried out.

12. The method according to claim 9, wherein said measuring includes:

calculating a reciprocal of a summation of said measured noise levels, and said weighting includes:

multiplying said RAKE synthesis signal by said reciprocal of said summation of said measured noise levels.

13. The method according to claim 9, wherein said measuring includes:

calculating a summation of said measured noise levels, and said weighting includes:

dividing said RAKE synthesis signal with a reciprocal of said summation of said measured noise levels.

14. The method according to claim 9, wherein said measuring includes:

measuring said noise level of each of said data path signals; and summing said measured noise levels over said paths to output said total noise amount.

15. The method according to claim 14, wherein said measuring said noise level includes:

estimating a distortion of a corresponding one of said data path signals;

dividing said corresponding data path signal by said estimated distortion to produce a divided signal;

calculating a first square of said divided signal;

calculating a second square of said estimated distortion;

subtracting one from said first square to produce a subtracted signal;

multiplying said subtracted signal by said second square; and averaging the multiplying results by said multiplier.

16. The method according to claim 9, wherein said receiver is a mobile terminal.

17. The method according to claim 16, wherein said reception signal is a signal from a mobile terminal of a CDMA system.

18. The method according to claim 9, wherein said receiver uses a maximum ratio RAKE synthesis.

* * * * *